United States Patent
Cheung

(10) Patent No.: US 10,379,665 B1
(45) Date of Patent: Aug. 13, 2019

(54) CONTROL PANEL ASSEMBLY

(71) Applicant: Crestron Electronics, Inc., Rockleigh, NJ (US)

(72) Inventor: King Woo Cheung, Newcity, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 68 days.

(21) Appl. No.: 15/882,029

(22) Filed: Jan. 29, 2018

(51) Int. Cl.
*G06F 3/041* (2006.01)
*G06F 3/0484* (2013.01)
*G06F 3/0488* (2013.01)

(52) U.S. Cl.
CPC .......... *G06F 3/0416* (2013.01); *G06F 3/0488* (2013.01); *G06F 3/04842* (2013.01)

(58) Field of Classification Search
CPC ... G06F 3/0416; G06F 3/0488; G06F 3/04842
See application file for complete search history.

(56) References Cited

U.S. PATENT DOCUMENTS

| | | | |
|---|---|---|---|
| 4,158,432 A | 6/1979 | Van Bavel | |
| 4,532,395 A | 7/1985 | Zukowski | |
| 5,458,307 A * | 10/1995 | Gebka | G09F 3/204 248/205.3 |
| 7,394,367 B1 | 7/2008 | Aupperle et al. | |
| 7,432,463 B2 | 10/2008 | Clegg et al. | |
| 8,102,375 B1 | 1/2012 | Feldstein | |
| 2006/0065510 A1* | 3/2006 | Kiko | H01H 9/161 200/1 R |
| 2006/0197660 A1* | 9/2006 | Luebke | G08B 25/009 340/539.26 |
| 2008/0136683 A1* | 6/2008 | Swatsky | H05B 37/0272 341/23 |
| 2008/0252599 A1* | 10/2008 | Ross | H04N 5/262 345/157 |
| 2009/0005165 A1* | 1/2009 | Arezina | G07F 17/32 463/37 |

(Continued)

OTHER PUBLICATIONS

Room GmbH, Manual for iRoom's iTop, V1.7, 2016.

*Primary Examiner* — Ibrahim A Khan
(74) *Attorney, Agent, or Firm* — Crestron Electronics, Inc.

(57) ABSTRACT

A touch control panel assembly defining a plurality of touch buttons each adapted to control at least one function of at least one associated load. The touch control panel assembly comprises a front panel assembly adapted to removably attach to a rear panel assembly. The rear panel assembly comprises a user interface board comprising a plurality of touch sensing fields disposed at locations corresponding to the plurality of touch buttons to detect user input through the front panel. The user interface also comprises a plurality of light sources to provide backlighting to the touch buttons. The front panel assembly comprises a front panel and a frame comprising a frame wall attached to a rear surface of the front panel. The frame wall comprises a plurality of openings extending therethrough at locations corresponding to the touch buttons that define a plurality of label compartments. A plurality of removable labels each adapted to be inserted into and retained by one of the label compartment with indicia disposed thereon to define the respective touch button perceivable through the front surface of the front panel at least when the respective light source is turned on.

37 Claims, 9 Drawing Sheets

(56) References Cited

U.S. PATENT DOCUMENTS

| | | | |
|---|---|---|---|
| 2009/0272016 A1* | 11/2009 | Grigsby | H01H 13/83 40/299.01 |
| 2010/0304934 A1* | 12/2010 | Woodson | A63B 24/0062 482/8 |
| 2010/0328203 A1* | 12/2010 | Hsu | G06F 1/1607 345/157 |
| 2011/0181446 A1* | 7/2011 | O'Donnell | H01H 13/76 341/22 |
| 2011/0281652 A1* | 11/2011 | Laverdiere | G06F 3/0219 463/37 |
| 2016/0006436 A1 | 1/2016 | Feldstein et al. | |
| 2018/0033572 A1* | 2/2018 | Ockert | G08B 25/12 |

* cited by examiner

US 10,379,665 B1

CONTROL PANEL ASSEMBLY

BACKGROUND OF THE INVENTION

Technical Field

Aspects of the embodiments relate to wall mounted control devices, and more specifically to a control panel assembly with customizable touch buttons.

Background Art

The popularity of home and building automation has increased in recent years partially due to increases in affordability, improvements, simplicity, and a higher level of technical sophistication of the average end-user. Generally, automation systems integrate various electrical and mechanical system elements within a building or a space, such as a residential home, commercial building, or individual rooms, such as meeting rooms, lecture halls, or the like. Examples of such system elements include heating, ventilation and air conditioning (HVAC), lighting control systems, audio and video (AV) switching and distribution, motorized window treatments (including blinds, shades, drapes, curtains, etc.), occupancy and/or lighting sensors, and/or motorized or hydraulic actuators, and security systems, to name a few.

One way a user can be given control of an automation system, is through the use of one or more control devices, such as a keypad. A keypad is typically mounted in a recessed receptacle in a building wall, commonly known as a wall or a gang box, and comprises one or more buttons or keys each assigned to perform a predetermined or assigned function. Assigned functions may include, for example, turning various types of loads on or off, or sending other types of commands to the loads, for example, orchestrating various lighting presets or scenes of a lighting load. Typically, the various buttons are removable and may be printed with indicia to either identify its respective function or the controlled load.

Recently, touch control panels have been introduced comprising a glass or transparent panel with backlit touch sensing buttons. Such touch control panels offer a modern, elegant, and fashionable alternative to the legacy wall keypads. However, touch control panels are difficult to customize and are typically provided with non-customizable generic controls. Some companies provide customization to the user by allowing the user to choose the indicia of the touch sensing buttons. Customarily, the customized indicia is engraved on the back of the glass allowing backlighting to pass through the engraved indicia. However, if a layout of a space is changed, an end user wishing to change the button configuration of the touch control panel has no choice but to replace the entire panel with a new device.

Another solution offers a single label with printed indicia that may be placed behind the transparent panel and which may be removed and replaced with another label. However, such as a label is limited in the available customization as the placement of the various indicial cannot be changed. While there are some current solutions that provide touch control panels with individual interchangeable labels for the individual touch sending buttons, these are inadequate. Such labels are difficult to replace and are not well retained within the touch control panels. The labels are also perceivable from the front of the touch control panel, resulting in a visually unappealing appearance. In addition, in many cases backlighting is not well implemented such that the indicia on the labels tends to be wash out and unperceivable to the user.

Therefore, a need has arisen for a control panel assembly with customizable touch buttons.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a control panel assembly with customizable touch buttons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a touch control panel assembly is provided defining a plurality of touch buttons each adapted to control at least one function of at least one associated load. Touch control panel assembly comprises a front panel with a substantially flat front surface, a frame comprising a frame wall secured to a rear surface of the front panel, and a user interface board disposed behind the frame wall. The frame wall comprises a plurality of openings extending therethrough at locations corresponding to the touch buttons. The user interface comprises a plurality of touch sensing fields disposed on a front surface of the user interface board at locations corresponding to the plurality of touch buttons to detect user input through the front panel. The user interface further comprises a plurality of light sources disposed at locations corresponding to the plurality of touch buttons to provide individual backlighting. The control panel assembly further comprises a plurality of label compartments defined by the openings in the frame wall and the rear surface of the front panel, wherein each label compartment comprises a pair of parallel side grooves each comprising a label receiving slot through a rear surface of the frame wall. The control panel also comprises a plurality of labels each sized for being slidably inserted through the label receiving slots, within the pair of side grooves, and into one of the label compartments. Each label comprises an indicia, wherein when the label is inserted in the label compartment the indicia is aligned with the respective opening in the frame wall such that the indicia is disposed between the respective touch sensing field and the rear surface of the front panel to define the respective touch button perceivable through the front surface of the front panel at least when the respective light source is turned on.

According to an embodiment, each label compartment may further comprise a pair of oppositely disposed side walls extending transversely through the frame wall, and a pair of side shoulders each partially extending along one of the side walls from a first end to a send end. Each side shoulder may comprise a front surface recessed in a front surface of the frame wall, wherein the pair of side grooves are formed between the front surfaces of the side shoulders and the rear surface of the front panel. According to an embodiment, each side shoulder may comprise a tapered wall tapering down from the front surface of the side shoulders to the first end of the side shoulder, wherein the tapered wall is adapted to guide one of the labels into the respective side groove.

According to an embodiment, each label compartment further comprises: a top retaining wall connected between the pair of side walls of the label compartment, wherein each first end of the side shoulders is spaced at a distance below the top retaining wall forming the label receiving slot. The label compartment may further comprise a pair of projections extending out of the side walls of the label compartment between the first ends of the side shoulders and the top retaining wall, wherein each label comprises a pair of side notches proximate a top end of the label, wherein each side notch is sized to receive one of the projections in the label compartment to lock the label within the label compartment. According to an embodiment, the top retaining wall extends transversely from the rear surface of the frame wall to a top tapered wall, wherein the top tapered wall tapers down from the top retaining wall to a terminal end at the front surface of the frame wall. The labels may comprise flexible material such that when one of the labels is inserted in one of the label compartments, a top end of the label is retained within the label compartment by the top retaining wall and is biased against the top tapered wall. According to an embodiment, each label compartment further comprises a center notch recessed through a center of the top retaining wall and partially through a center of the top tapered wall and accessible from the rear surface of the frame wall, wherein the center notch is adapted to receive an object to facilitate removal of the label from the label compartment.

According to an embodiment, each label compartment further comprises a bottom wall comprising a bottom shoulder extending out of the bottom wall that comprises a front surface recessed in the front surface of the frame wall, wherein the bottom shoulder forms a bottom groove between the front surface of the bottom shoulder and the rear surface of the front panel, wherein when inserted a bottom end of the label is retained in the bottom groove.

According to an embodiment, the touch panel assembly further comprises a rear panel assembly and a front panel assembly adapted to removably attach to the rear panel assembly; wherein the front panel assembly comprises the front panel and the frame; wherein the rear panel assembly comprises the user interface board and a rear housing adapted to be secured to a wall box.

According to a further embodiment, each light source is disposed on the front surface of the user interface board adjacent the respective touch sensing field. According to an embodiment, the touch control panel assembly further comprises a plurality of light bars each positioned over the respective touch sensing field and adjacent the respective light source. Each light source may be adapted to direct light to a side edge of the respective light bar, and wherein the respective light bar is adapted to distribute light from its side edge to its front surface. The touch control panel assembly may further comprise a light blocking cover disposed between the user interface board and the frame wall, wherein the light blocking cover comprises a plurality of openings each sized to surround one of the light bars and the respective light source and adapted to be aligned with the respective touch button, wherein the light blocking cover comprises a substantially opaque material adapted to prevent light bleeding therethrough. Each light bar and the respective light source may be substantially contained within the respective label compartment and the respective opening in the light blocking cover between the user interface board and the respective label preventing light bleeding to the remainder of the label compartments.

According to an embodiment, the touch control panel assembly further comprises a controller comprising an active timer and a standby timer, wherein the controller is adapted to: maintain the light sources at an off state; upon detecting user input by one of the touch sensing fields, restart the active timer and turn on the light sources to an active state; when the active timer expires, restart the standby timer and turn on the light sources to an idle state; and when the standby timer expires, turn off the light sources.

According to a further embodiment, the touch control panel comprises a proximity sensor and a controller comprising an active timer and a standby timer, wherein the controller is adapted to: maintain the light sources at an off state; upon detecting an object proximate to the control panel by the proximity sensor, restart the active timeout timer and turn on the light sources to an active state; when the active timer expires, restart the standby timer and turn on the light sources to an idle state; and when the standby timer expires, turn off the light sources. According to another embodiment, the touch control panel assembly comprises a controller and a light sensor adapted to detect ambient light, wherein the controller is adapted to adjust light levels of the light sources based on the detected ambient light by the light sensor.

According to yet another embodiment, each label comprises a substantially opaque label background area and at least one transparent or substantially translucent indicia area forming the indicia thereon. The indicia areas may be adapted to permit light to pass therethrough from the respective light source to the front panel. The front panel may comprise a substantially opaque background area and a plurality of translucent windows disposed at locations corresponding to the touch buttons. According to an embodiment, the front panel may comprise a transparent material, wherein the front panel background area and the front panel windows are formed on the rear surface of the front panel. According to an embodiment, a transmissivity level of each label background area may substantially match that of the front panel background area such that the front panel windows are substantially unperceivable from the front surface of the front panel. According to an embodiment, the front panel windows comprise a low transmissivity level. According to a further embodiment, when the light sources are turned off, the label indicia areas are substantially unperceivable from the front surface of the front panel, wherein when the light sources are turned on light passes through the label indicia areas and the front panel windows such that the indicia is perceivable from the front surface of the front panel. According to an embodiment, the front panel comprises a translucent layer substantially covering the rear surface of the front panel, and a substantially opaque layer disposed over the translucent layer, wherein the substantially opaque layer defines the panel background area by exposing areas forming the translucent widows.

According to another aspect of the embodiments, a touch control panel assembly is provided defining a plurality of touch buttons each adapted to control at least one function of at least one associated load. The touch control panel assembly comprises a rear panel assembly and a front panel assembly adapted to removably attach to the rear panel assembly. The rear panel assembly comprises a rear housing adapted to be secured to a wall box, and a user interface board disposed in the rear housing and comprising a plurality of touch sensing fields disposed on a front surface of the user interface at locations corresponding to the plurality of touch buttons. The front panel assembly comprises a front panel with a substantially flat front surface and a frame comprising a frame wall attached to a rear surface of the front panel. The frame wall comprises a plurality of openings extending therethrough at locations corresponding to the touch buttons. A plurality of label compartments are defined by the openings in the frame wall and the rear surface of the front panel. Each label compartment comprises a pair of parallel side grooves each comprising a label receiving slot through a rear surface of the frame wall. The control panel further comprises a plurality of labels each comprising in indicia, wherein each label is adapted to slidably insert through the label receiving slots, within the pair of side grooves, and into one of the label compartments when the front panel assembly is detached from the rear panel assembly. According to an embodiment, when the front panel assembly is attached to the rear panel assembly, the user interface board is disposed adjacent the front panel such that the touch sensing fields are adapted to detect user input through the front panel, and each label indicia is disposed between one of the touch sensing fields and the rear surface of the front panel to define the touch button.

According to another aspect of the embodiments, a touch control panel assembly is provided defining a plurality of touch buttons each adapted to control at least one function of at least one associated load. The touch control panel assembly comprises a front panel, a frame comprising a frame wall attached to a rear surface of the front panel, and a user interface board disposed behind the frame. The front panel comprises a substantially opaque background area and a plurality of translucent windows disposed at locations aligned with the touch buttons. The frame wall comprises a plurality of openings extending therethrough at locations corresponding to the touch buttons that define a plurality of label compartments. The user interface board comprises a plurality of touch sensing fields disposed on a front surface of the user interface board at locations corresponding to the plurality of touch buttons to detect user input through the front panel. The user interface board further comprises a plurality of light sources each disposed on the front surface of the user interface adjacent one of the touch sensing fields. The control panel further comprises a plurality of removable labels adapted to be inserted into and retained by the label compartments, wherein each label comprises a substantially opaque background area and at least one transparent or substantially translucent indicia area forming indicia thereon.

According to an embodiment, the indicia areas are adapted to permit light to pass therethrough from the respective light source to the front panel. The front panel may comprise a transparent material, wherein the front panel background area and the front panel windows are formed on the rear surface of the front panel. The front panel background area and the front panel windows may be formed using at least one of tinting, painting, applying a film, engraving, etching, and any combinations thereof. The transmissivity level of each label background area may substantially match that of the front panel background area such that the front panel windows are substantially unperceivable from the front surface of the front panel. According to an embodiment, the front panel windows comprise a low transmissivity level. According to an embodiment, when the light sources are turned off, the label indicia areas are substantially unperceivable from the front surface of the front panel, wherein when the light sources are turned on light passes through the label indicia areas and the front panel windows such that the indicia is perceivable from the front surface of the front panel. The front panel may comprises a translucent layer substantially covering the rear surface of the front panel, and a substantially opaque layer disposed over the translucent layer, wherein the substantially opaque layer defines the panel background area by exposing areas forming the translucent widows. According to an embodiment, the control panel may further comprises a plurality of light bars each positioned over the respective touch sensing field and adjacent the respective light source. Each light source may be adapted to direct light to a side edge of the respective light bar, and wherein the respective light bar is adapted to distribute light from its side edge to its front surface.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
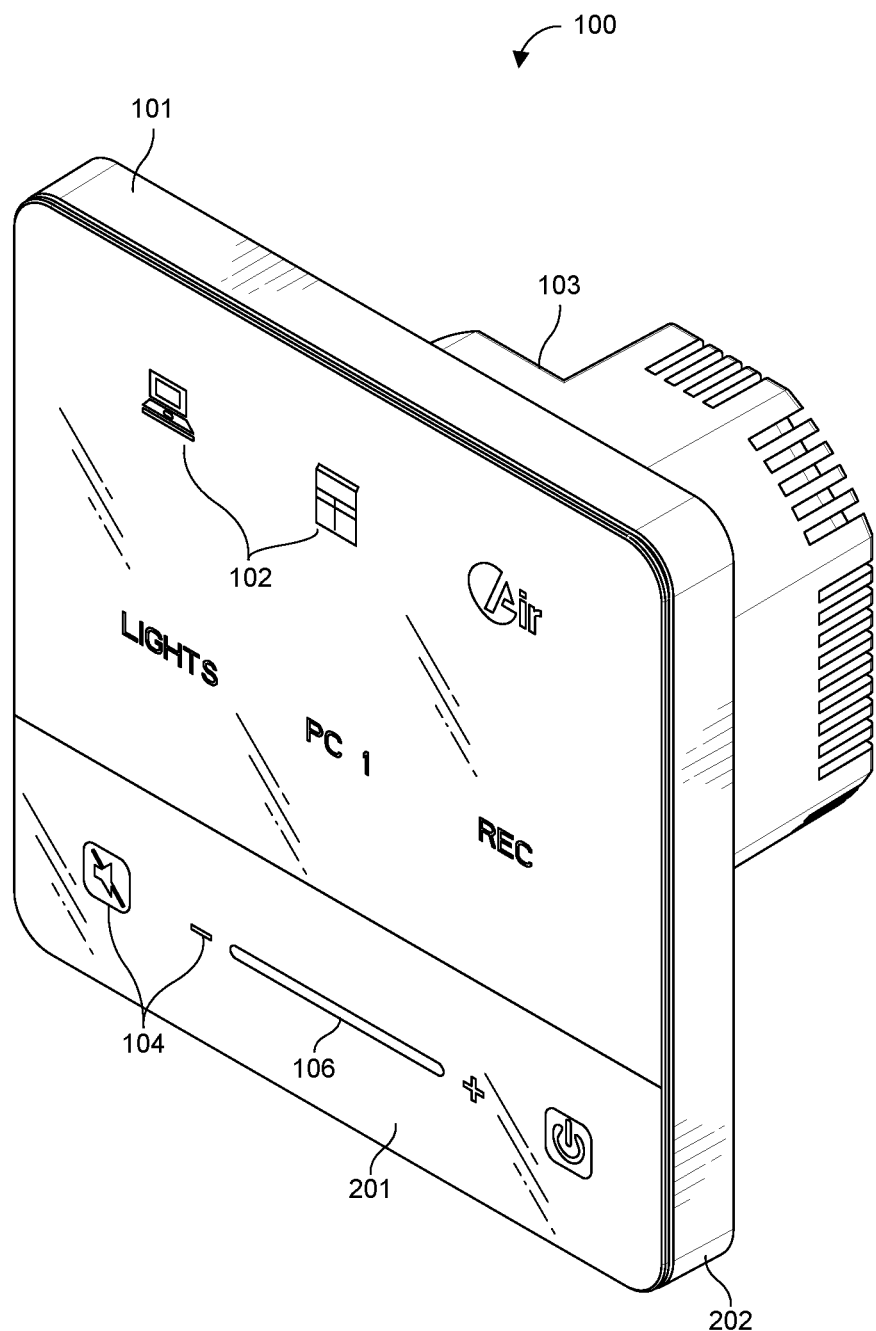

FIG. 1 illustrates a perspective view of a control panel assembly according to an illustrative embodiment.

Figure 2:
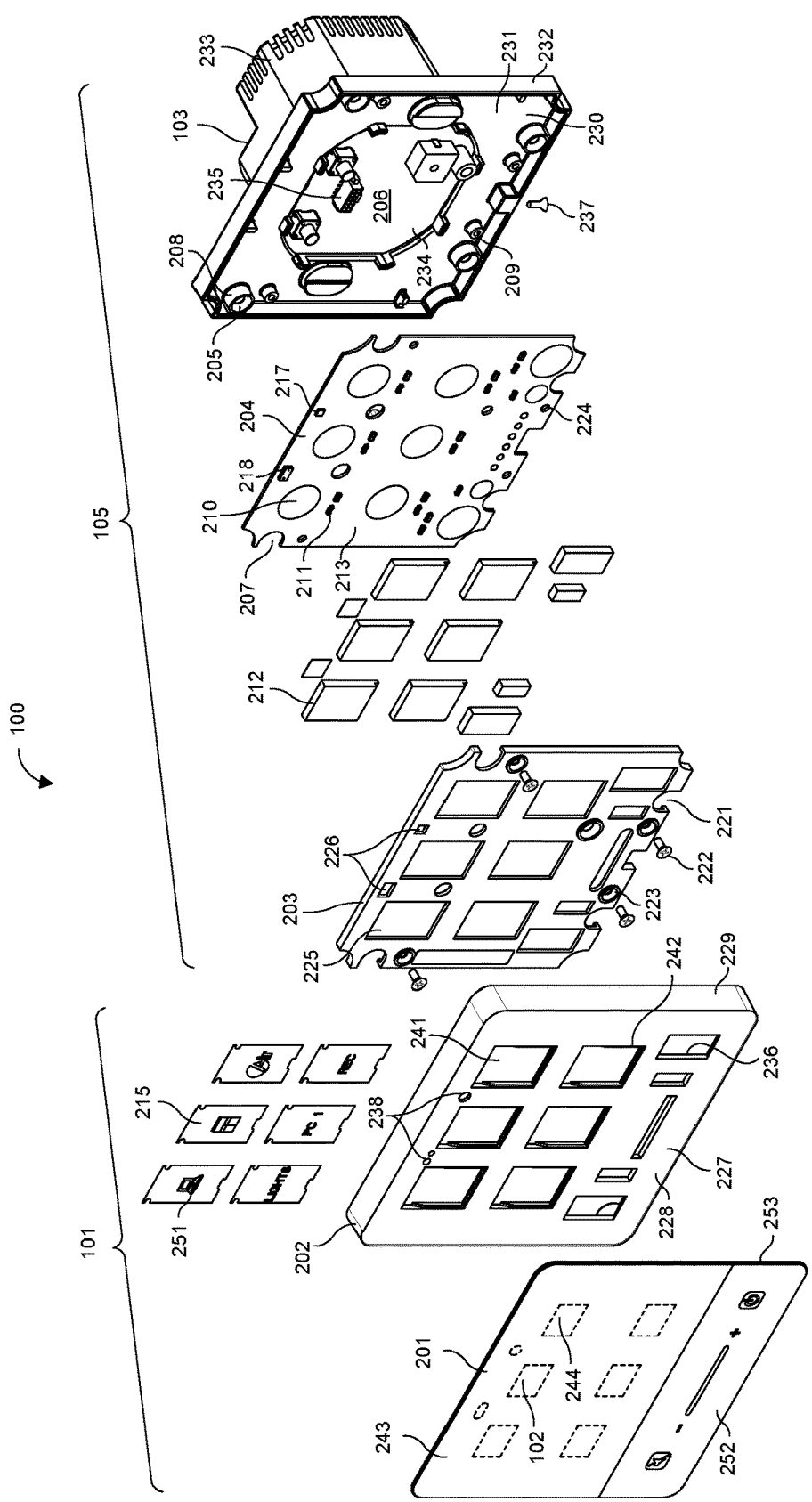

FIG. 2 illustrates an exploded perspective front view of the control panel assembly according to an illustrative embodiment.

Figure 3:
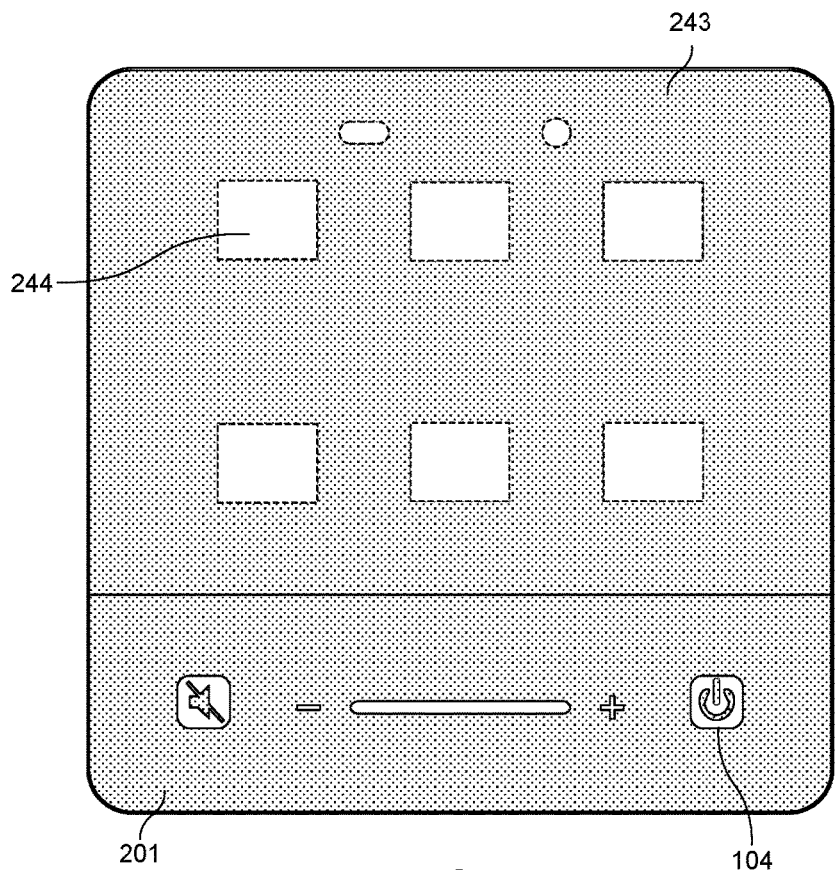

FIG. 3 illustrates a front view of the front panel of the control panel assembly according to an illustrative embodiment.

Figure 4:
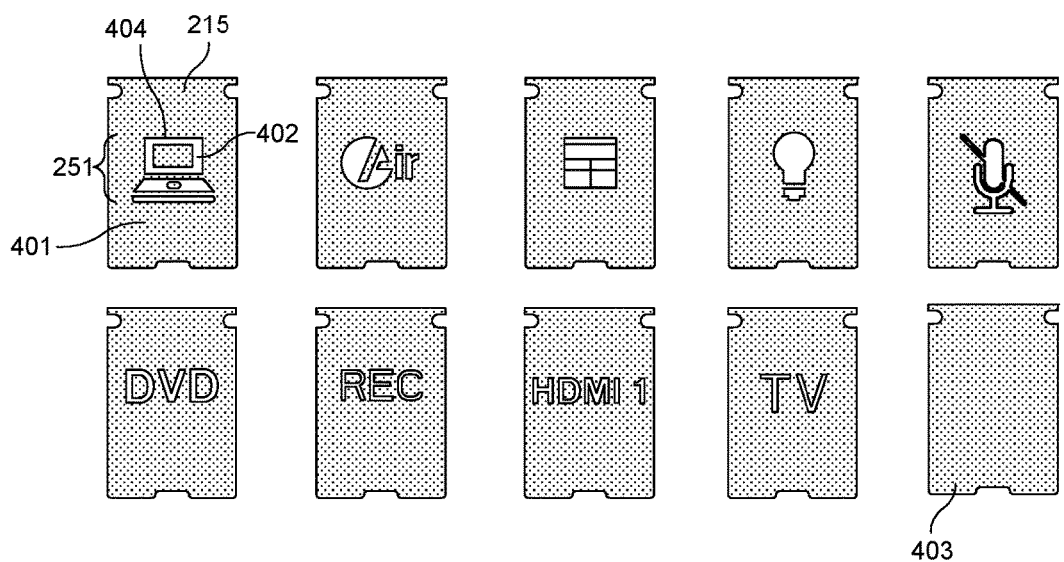

FIG. 4 illustrates a front view of exemplary removable labels according to an illustrative embodiment.

Figure 5A:
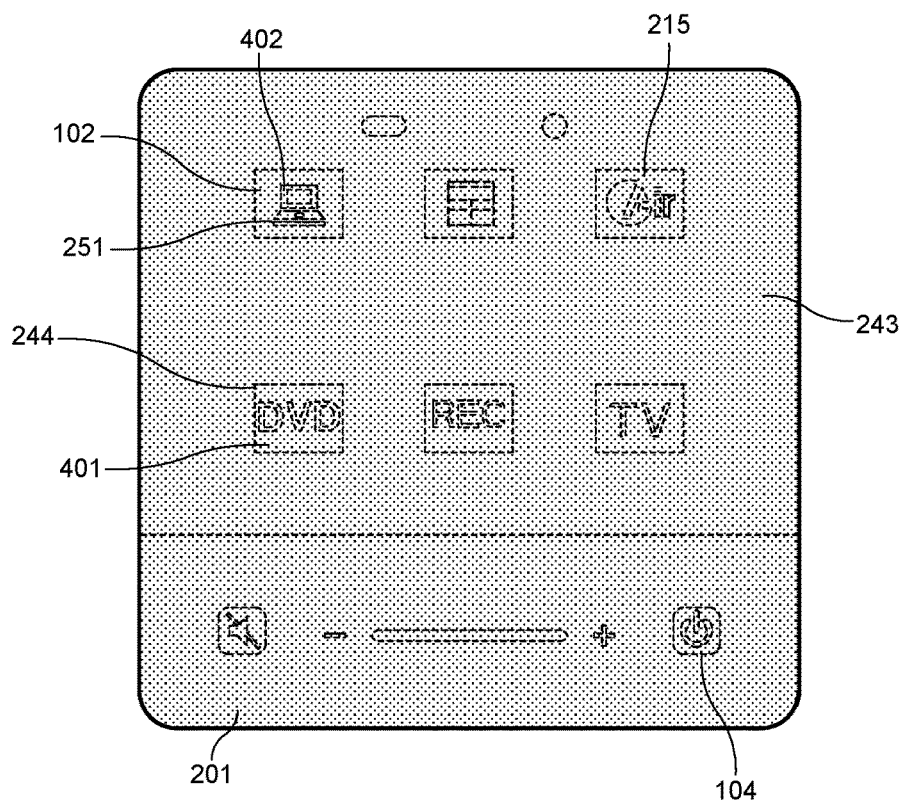

FIG. 5A illustrates a front view of the control panel assembly in a turned off state according to an illustrative embodiment.

Figure 5B:
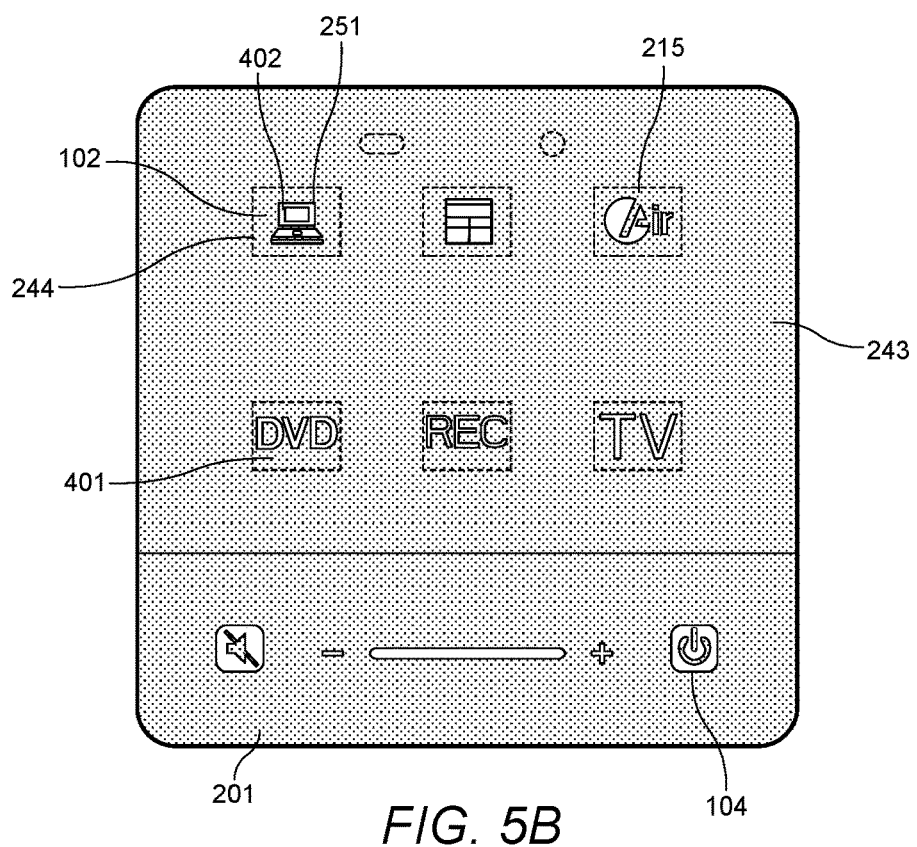

FIG. 5B illustrates a front view of the control panel assembly in a turned on state according to an illustrative embodiment.

Figure 6:
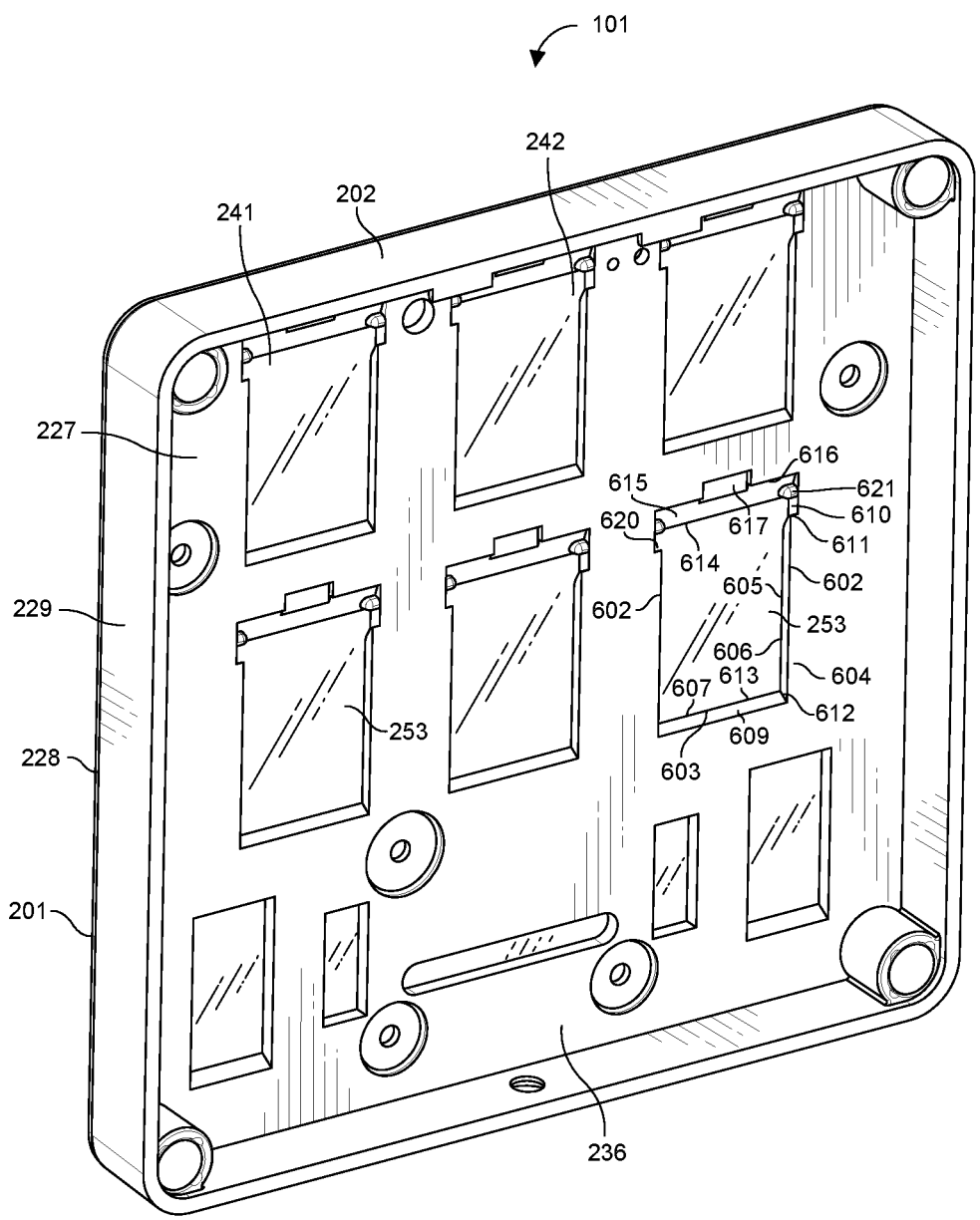

FIG. 6 illustrates a rear perspective view of the front panel assembly according to an illustrative embodiment.

Figure 7:
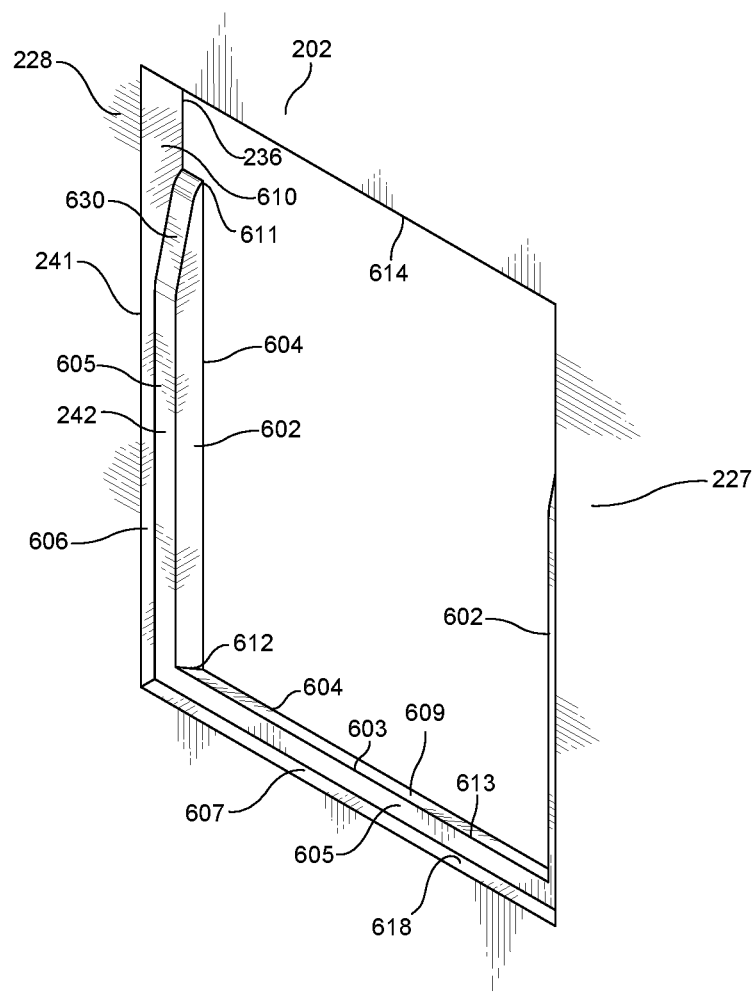

FIG. 7 illustrates a front perspective view of the frame showing the label compartment in the frame of the front panel assembly according to an illustrative embodiment.

Figure 8B:
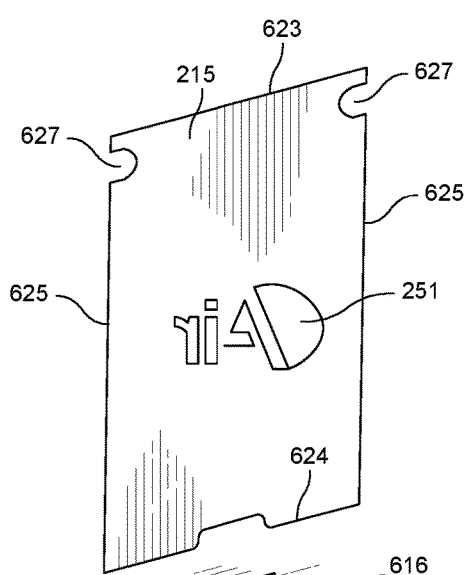
Figure 8B:
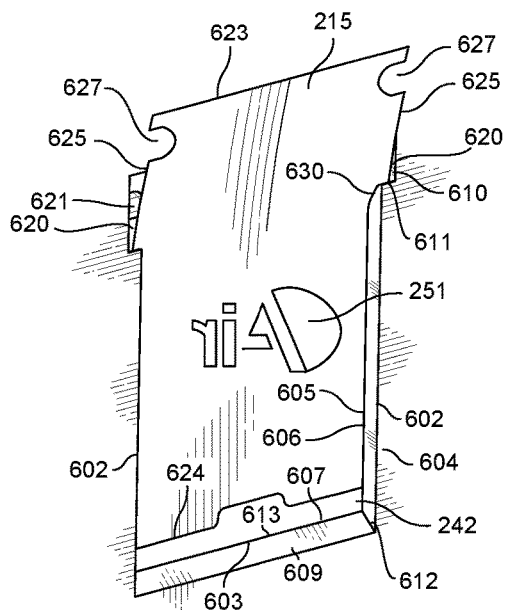
Figure 8A:
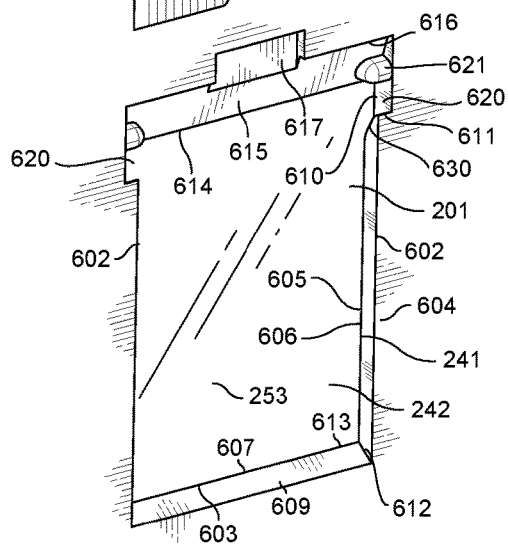

FIG. 8A illustrates a rear perspective view of the label compartment and a removable label according to an illustrative embodiment.

FIG. 8B illustrates a rear perspective view of the removable label partially inserted in the label compartment according to an illustrative embodiment.

Figure 8C:
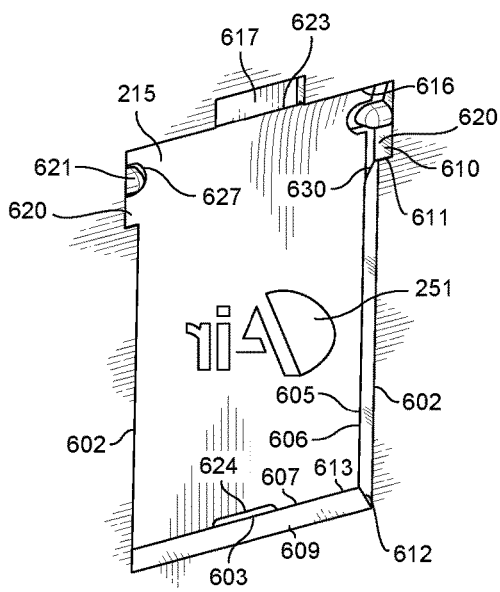

FIG. 8C illustrates a rear perspective view of the removable label fully inserted in the label compartment according to an illustrative embodiment.

Figure 9:
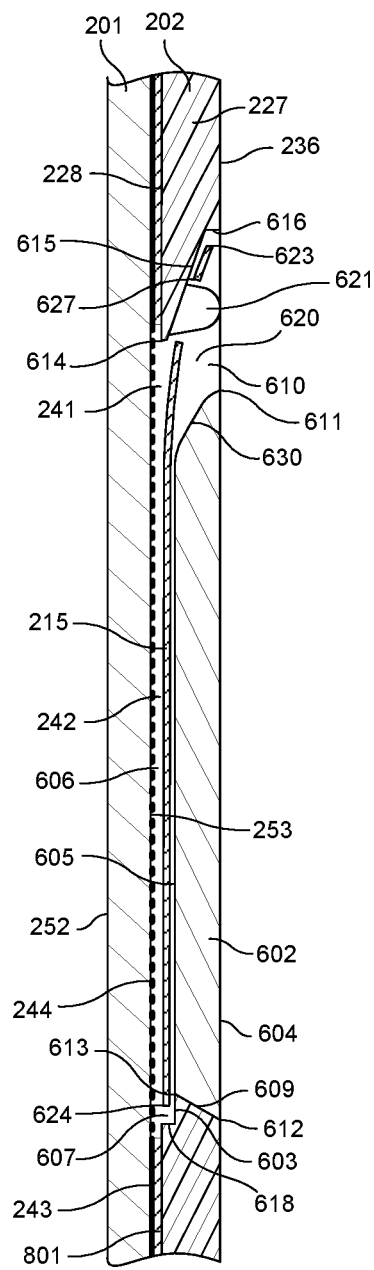

FIG. 9 illustrates a side cross sectional view of the label inserted in the label compartment of the front panel assembly according to an illustrative embodiment.

Figure 10:
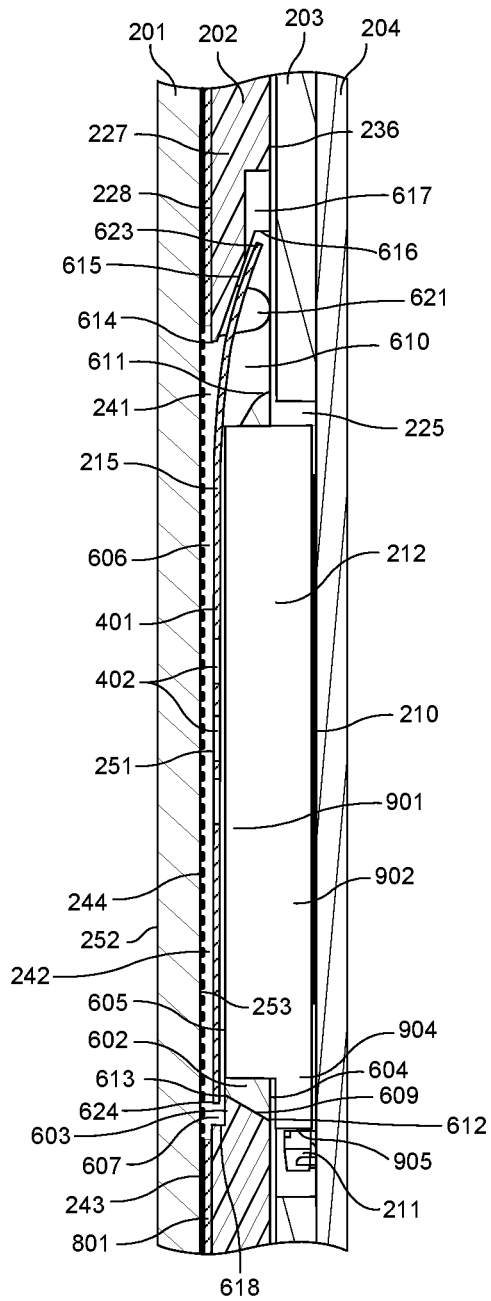

FIG. 10 illustrates a side cross sectional view of the label inserted in the label compartment of the front panel assembly as well as the light blocking cover, light bar, and user interface PCB when the front panel assembly is secured to the rear panel assembly according to an illustrative embodiment.

Figure 11:
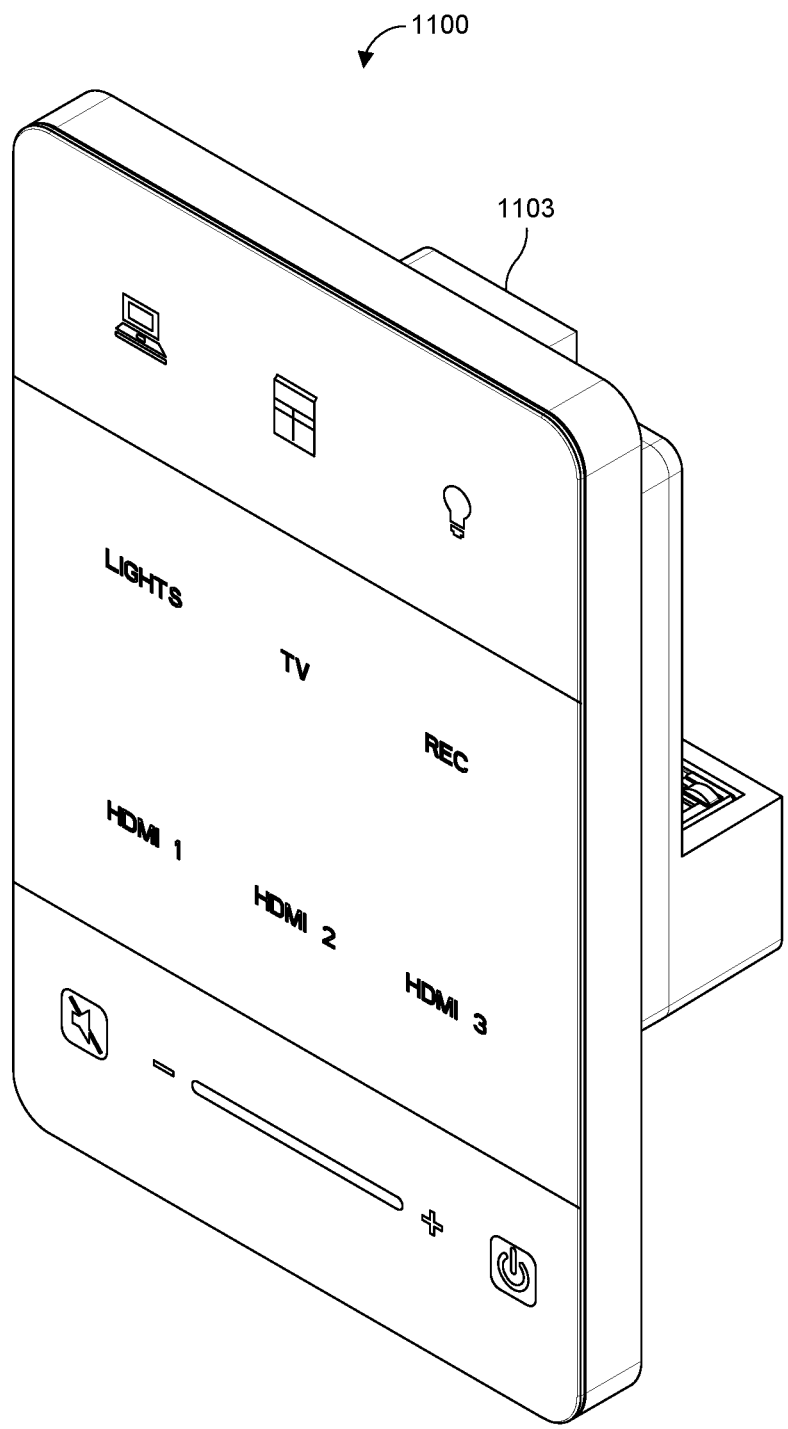

FIG. 11 illustrates a perspective view of a control panel assembly according to another illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
- 100 Control Panel Assembly
- 101 Front Panel Assembly
- 102 Customizable Touch Buttons
- 103 Rear Housing
- 104 Fixed Touch Buttons
- 105 Rear Panel Assembly
- 106 Multi-Segment Lit Bar Graph
- 201 Front Panel
- 202 Frame
- 203 Light Blocking Cover
- 204 User Interface PCB
- 205 Holes
- 206 Rear PCBs
- 207 Notches
- 208 Posts
- 209 Threaded Holes
- 210 Touch Sensors/Touch Sensing Fields
- 211 Light Sources
- 212 Light bars
- 213 Front Surface
- 215 Removable Labels
- 217 Light Sensor
- 218 Motion Sensor
- 221 Notches
- 222 Screws
- 223 Holes
- 224 Holes
- 225 Openings
- 226 Openings
- 227 Front Wall
- 228 Front Surface
- 229 Peripheral Wall
- 230 Front Wall
- 231 Front Surface
- 232 Peripheral Wall
- 233 Enclosure
- 234 Opening
- 235 Interface
- 236 Rear Surface
- 237 Screw
- 238 Orifices
- 241 Openings
- 242 Label Compartments
- 243 Background Area
- 244 Windows
- 251 Indicia
- 252 Front Surface
- 253 Rear Surface
- 401 Background Area
- 402 Indicia Areas
- 404 Accent Lines
- 602 Side Shoulders
- 603 Bottom Shoulder
- 604 Rear Surface
- 605 Front Surface
- 606 Vertical Side Grooves
- 607 Horizontal Bottom Groove
- 609 Bottom Tapered Wall
- 610 Side Walls
- 611 First End
- 612 Second End
- 613 Terminal End of Tapered Wall
- 614 Terminal End
- 615 Top Tapered Wall
- 616 Top Retaining Wall
- 617 Notch
- 618 Bottom Wall
- 620 Label Receiving Slots
- 621 Projections
- 623 Top End
- 624 Bottom End
- 625 Side Ends
- 627 Semicircular Notches
- 630 Tapered Wall
- 801 Adhesive
- 901 Front Portion
- 902 Rear Portion
- 904 Shoulder
- 905 Side Edge 1100 Control Panel
1102 Customizable Touch Buttons
1103 Rear Housing

LIST OF ACRONYMS USED IN THE SPECIFICATION IN ALPHABETICAL ORDER

The following is a list of the acronyms used in the specification in alphabetical order.
AC Alternating Current
ASIC Application Specific Integrated Circuits
AV Audiovisual
CPU Central Processing Unit
HVAC Heating, Ventilation and Air Conditioning
IR Infrared
LED Light Emitting Diode
PCB Printed Circuit Board
PoE Power-over-Ethernet
RAM Random-Access Memory
RF Radio Frequency
RISC Reduced Instruction Set Computer
ROM Read-Only Memory
VDC Volts of Direct Current

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of wall mounted control devices, but are not limited thereto, except as may be set forth expressly in the appended claims. Referring to FIG. 1, there is shown an illustrative wall mounted control device, and more particularly a wall mounted control panel assembly 100. The control panel 100 comprises a front panel assembly 101 containing a plurality of customizable touch buttons 102. The control panel 100 further comprises a rear housing 103 designed to fit into a standard electrical gang box. For example, the control panel 100 shown in FIG. 1 may be mounted to a single European gang box. FIG. 11 illustrates a control panel 1100 with customizable touch buttons 1102 and rear housing 1103 designed to fit into a single US gang box. According to yet another embodiment, control panel 100 or 1100 may be table mounted, inside a table top enclosure. The tabletop enclosure may be configured to sit freestanding on a table with cables coming out of the back. In another embodiment, the tabletop enclosure may comprise a swivel option with cables coming out of the bottom for permanent attachment to a table.

According to an embodiment, the control panel 100 may serve as a user interface to connected loads or load controllers in a space. In an illustrative embodiment, the control panel 100 may be configured to receive control commands directly from a user via touch buttons 102 and transmit the control command to a load or to a load controller electrically connected the load to control an operation of the load based on the control commands. In various aspects of the embodiments, the control panel 100 may control various types of electronic devices or loads. The control panel 100 may comprise an assortment of programmable control ports for interfacing with various types of electronic devices or loads, including, but not limited to audiovisual (AV) equipment, lighting, shades, screens, computers, laptops, heating, ventilation and air conditioning (HVAC), security, appliances, and other room devices. Each touch button 102 may be associated with a particular load. The control panel 100 may be used in residential load control, or in commercial settings, such as classrooms or meeting rooms.

According to an embodiment, the control panel 100 may comprise six programmable touch buttons 102 comprising removable labels, as will be described in a greater detail below. However, any number of customizable touch buttons 102 may be used. For example, as shown in FIG. 11, for a US gang box implementation, nine customizable touch buttons 1102 may be used. Returning to FIG. 1, the control panel 100 may also comprise a set of fixed touch buttons 104 at the bottom of the control panel 100 with predefined functionality, such as mute, volume down, volume up, and power. Between the volume down and volume up buttons, the control panel 100 may comprise a multi-segment lit bar graph 106 used to display the current volume setting. The customizable touch buttons 102 and fixed touch buttons 104 may be backlit, for example via light emitting diodes (LED), and provide haptic feedback on button presses. For example, the customizable touch buttons 102 and fixed touch buttons 104 may be backlit by white, blue, or another color LEDs when active.

Referring to FIG. 2, there is shown an exploded front perspective view of the control panel assembly 100. The control panel assembly 100 may comprise a front panel assembly 101 and a rear panel assembly 105. Rear panel assembly 105 may comprise the rear housing 103, a user interface printed circuit board (PCB) 204, a plurality of light bars 212, and a light blocking cover 203.

The rear housing 103 may comprise a metal enclosure 233 configured for providing convective air cooling for electrical components therein. The rear housing 103 may comprise a front wall 230 connected to the enclosure 233. The front wall 230 may comprise a substantially flat front surface 231 with an opening 234 therethrough for accessing the enclosure 233. A peripheral wall 232 may extend perpendicularly from the front surface 231 around the periphery of the front wall 231. The rear housing 103 may further comprise a plurality of posts 208 comprising holes 205 configured for mounting the rear housing 103 to a mounting bracket (not shown), which may be secured to a standard gang box using screws (not shown). When mounted, the enclosure 233 of the rear housing 103 is inserted into the gang box while the rear surface of the front wall 230 covers the opening of the gang box and rests against the structural wall of the room.

The rear housing 103 may further contain a plurality of circuit components and/or printed circuit boards (PCBs) 206 configured for providing various functionality to the control panel 100. For example, the rear PCBs 206 may contain a power supply configured for providing power to the various circuit components of the control panel 100. The control panel 100 may be powered by an electric alternating current (AC) power signal from an AC mains power source. Such control panel 100 may comprise leads suitable for making line voltage connections. In another embodiment, the control panel 100 may be powered using Power-over-Ethernet (PoE) and may comprise a PoE interface, such as an Ethernet RJ45 connector. In another embodiment, power may be provided via a Cresnet® port. Cresnet® provides a network wiring solution for Creston® keypads, lighting controls, thermostats, and other devices. The Cresnet® bus offers wiring and configuration, carrying bidirectional communication and 24 VDC power to each device over a simple 4-conductor cable.

The rear PCBs 206 may further include a controller comprising one or more central processing units (CPU), memories, communication interfaces, or the like, contained in the rear housing 103. The CPU can represent one or more microprocessors, such as "general purpose" microprocessors, a combination of general and special purpose microprocessors, or application specific integrated circuits (ASICs). Additionally, or alternatively, the CPU can include one or more reduced instruction set (RISC) processors, video processors, or related chip sets. The CPU can provide processing capability to execute an operating system, run various applications, and/or provide processing for one or more of the techniques and functions described herein. The memory may be communicably coupled to the CPU and can store data and executable code. The memory can represent volatile memory such as random-access memory (RAM), and/or nonvolatile memory, such as read-only memory (ROM) or Flash memory. In buffering or caching data related to operations of the CPU, the memory can store data associated with applications running on the CPU.

The one or more communication interfaces on rear PCBs 206 may comprise a wired or a wireless communication interface, configured for transmitting control commands to various connected loads or electrical devices. A wireless interface may be configured for bidirectional wireless communication with other electronic devices over a wireless network. In various embodiments, the wireless interface can comprise a radio frequency (RF) transceiver, an infrared (IR) transceiver, or other communication technologies known to those skilled in the art. In one embodiment, the wireless interface communicates using the infiNET EX® protocol from Crestron Electronics, Inc. of Rockleigh, N.J. infiNET EX® is an extremely reliable and affordable protocol that employs steadfast two-way RF communications throughout a residential or commercial structure without the need for physical control wiring. In another embodiment, communication is employed using the ZigBee® protocol from ZigBee Alliance. In yet another embodiment, the wireless communication interface may communicate via Bluetooth transmission. A wired communication interface may be configured for bidirectional communication with other devices over a wired network. The wired interface can represent, for example, an Ethernet or a Cresnet® port. In various aspects of the embodiments, control panel 100 can both receive the electric power signal and output control commands through the PoE interface. According to various embodiments, the rear hosing 103 may contain various types of connectors or ports on its back, such as, but not limited to a micro USB A/B connector, a PoE connector (802.3af or at), multi pin Phoenix connectors for RS-232, low voltage relays, Versiports, digital or analog input ports, or the like.

The user interface PCB 204 mounts over the front wall 230 of the rear housing 103 such that it is contained within the peripheral wall 232 of the rear housing 103. The front panel PCB 107 may contain a plurality of semicircular notches 207 configured for receiving posts 208 extending perpendicularly from the front wall 230 of the rear housing 103 for aligning the PCB 107 with respect to the rear housing 103. The front panel PCB 107 may comprise an interface on its rear surface (not shown) that connects to the interface 235 of the rear PCBs 206 to receive power and for communication with the CPU. A front surface 213 of the user interface PCB 204 may comprise a plurality of touch sensors which may comprise a plurality of predefined capacitive touch sensing fields 210 connected to a touch sensor controller on the PCB 204. The touch sensor controller is configured for perceiving changes in capacitance of the touch sensing fields 210 in order to detect a touch or proximity of a conductive object, such as a user's finger. As such, the touch sensors are configured for detecting user touch of the customizable touch buttons 102 on the front surface 252 of the front panel 201.

The user interface PCB 204 may further comprise a plurality of light sources 211, such as light emitting diodes (LEDs), configured for providing backlighting to the customizable touch buttons 102. Each light source 211 may be located adjacent to a touch sensing field 210. The plurality of LEDs 211 may be powered using LED drivers located on PCB 204.

The user interface PCB 204 may further comprise a wide dynamic range light sensor 217 configured for detecting and measuring ambient light. Light sensor 217 may be used to control the lighting levels of the light sources 211 based on the measured ambient light. According to an embodiment, light sensor 217 may impact the brightness levels of the light sources 211 to stay at the same perceived levels based on ambient light levels. A light curve may be used to adjust the brightness of the light sources 211 based on measured ambient light levels by the light sensor 217. According to another embodiment, threshold values may be used.

According to an embodiment, the controller of the control panel 100 may control the light sources 211 based on idle brightness levels when the unit is in an idle state, and active brightness levels when the unit is in an active state. For example, the controller of the control panel 100 may store an idle brightness curve and an active brightness curve. The idle and active brightness levels may be preset or may be set by the user or installer. The active brightness levels may comprise higher brightness intensity than the idle brightness levels. According to an embodiment, the controller of the control panel 100 may further comprise an active timeout timer, indicating how long after last button press does the state go back to an idle state, and a standby timeout timer, indicating how long after being in an idle state before going off. According to an embodiment, the active timeout and the idle timeout may be predetermined or set by the user or installer. For example, the backlighting of the touch buttons 102 may be generally maintained at an off state. When a user presses a button 102, the active timer restarts and the LEDs 211 may go to an active state and operate based on the active brightness levels. When the active timeout timer expires, the standby timer may restart and the LEDs 211 may go to the idle state and operate based on the idle brightness levels. When the standby timeout timer expires, the LEDs 211 may turn off.

In addition, the user interface PCB 204 may comprise a motion or proximity sensor 218, such as a laser ranging motion sensor, configured for waking up the control panel 100 upon detecting a user in proximity of the control panel 100, for example when a user is within about 24 inches or less of the unit. Upon detecting a user proximate to the control panel 100, the light sources 211 may be activated to illuminate the touch buttons 102. According to an embodiment, the backlighting of the touch buttons 102 may be generally maintained in an off state. When proximity is detected by the proximity sensor 218, the active timeout timer may restart and the LEDs 211 may go to an active state and operate based on the active brightness levels. When the active timeout timer expires, the standby timer may restart and the LEDs 211 may go to the idle state and operate based on the idle brightness levels. When the standby timeout timer expires, the LEDs 211 may turn off.

The rear panel assembly 105 may further comprise a plurality of rectangular light pipes or light bars 212 each positioned over a respective touch sensing field 210 and adjacent to a respective light source 211. According to an embodiment, the light bars 212 may be attached to the front surface 213 of the user interface PCB 204 using an adhesive. The light bars 212 are configured for distributing and diffusing light from the respective light source 211 to the touch buttons 102 for uniform illumination as well as reduced shadowing and glare. Beneficially, the panel assembly 101 comprise individual light bars 212 each providing light feedback or backlighting to individual touch buttons 102. Light bars 212 may be fabricated from optical fiber or transparent plastic material such as acrylic, polycarbonate, or the like.

The rear panel assembly 105 may further comprise a light blocking cover 203 positioned over the user interface PCB 204 as well as the light bars 212. Light blocking cover 203 may comprise semicircular notches 221 configured for receiving the posts 208 extending from the rear housing 103 for aligning the light blocking cover 203 with respect to the rear housing 103. Screws 222 may be used to secure cover 203 and the user interface PCB 204, and thereby the light bars 212, to the rear housing 103 by inserting screws 222 through holes 223 in cover 203, holes 224 in PCB 204, and into threaded holes 209 in rear housing 103. Thereby, the light blocking cover 203, user interface PCB 204, light bars 212, and rear housing 103 may be shipped to an end user as a single rear cover assembly 105.

Light blocking cover 203 may comprise rectangular openings 225 extending traversely therethrough sized to surround a respective light bar 212. Each opening 225 is further aligned with a respective touch sensing field 210. Light blocking cover 203 is configured for preventing light bleeding from one light bar 212 and light source 211 to another. In addition, light blocking cover 203 comprises rectangular openings 226 extending traversely therethrough and each aligned with the light sensor 217 and the motion sensor 218. As such, light blocking cover 203 further prevents the backlighting from light sources 211 to interfere with the light sensor 217 and motion sensor 218. According to an embodiment, the light blocking cover 203 may comprise an opaque material, such as a black colored plastic or the like, that impedes light transmission through the light blocking cover 203.

The front panel assembly 101 may comprise a front panel 201 and a frame 202 for receiving removable labels 215. The frame 202 may comprise a front wall 227 with a substantially flat front surface 228 and a rear surface 236. A peripheral wall 229 may extend perpendicularly from the rear surface 236 of the frame 202 about the periphery of the front wall 227.

Frame 202 may comprise a plurality of rectangular openings 241 extending traversely through the front wall 227 of the frame 202. Openings 241 are aligned with openings 225 in the light blocking cover 203 and touch sensing fields 212. Each opening 241 may be sized to surround at least a front portion of a respective light bar 212 and similarly to the light blocking cover 203 prevent light bleeding from one light bar 212 and light source 211 to another. According to an embodiment, the frame 202 may comprise an opaque material, such as a black colored plastic or the like, that impedes light transmission through the front wall 227 of the frame 202. In addition, frame 202 may comprise a plurality of orifices 238 extending traversely therethrough and each aligned with the light sensor 217 and the motion sensor 218.

The front panel 201 of the front panel assembly 101 comprises a substantially flat front surface 252 and a rear surface 253. The front panel 201 may comprise a square shape, as shown in FIG. 2, a rectangular shape, as shown in FIG. 11, or any other desired shape, such as a circular shape, or the like. The rear surface 253 of the front panel 201 may be secured to the front surface 228 of the frame 202 using an adhesive (801, FIG. 9) such that the front panel 201 and frame 202 may be shipped to an end user as a single front panel assembly 101. When assembled, openings 241 in the frame 202 and the rear surface 253 of the front panel 201 may define label compartment 242 configured for receiving and locking the removable labels 215 therein. Removable labels 215 may contain indicia 251 configured for identifying the load that is being controlled by the respective touch button 102. The front panel 201 may comprise an opaque background area 243 and a plurality of translucent or at least partially transparent windows 244. When assembled, each window 244 in the front panel 201 is aligned with a respective opening 241 and label compartment 242 in the frame 202 such that label indicia 251 on a respective removable label 215 may be viewed through the window 244 as discussed below.

According to an embodiment, the control panel assembly 100 is configured to be shipped to an end user or an installer with an assembled rear panel assembly 105, an assembled front panel assembly 101, and a plurality of customized removable labels 215. During installation, the rear panel assembly 105 may be connected to one or more loads or electric devices using wire leads or plugs extending out of an electrical gang box. The rear panel assembly 105 may then be installed in the gang box by inserting the enclosure 233 in the gang box and securing the rear housing 103 to the gang box via screws. Each touch button 102, and particularly each touch sensing field 210, may then be programmed to correspond to one of the connected loads or electric devices. Removable labels 215 with appropriate customized indicia 251 may then be inserted and locked into desired label compartments 242 in the front panel assembly 101, as will be further described below. The front panel assembly 101 may then be attached to the rear panel assembly 105 such that the peripheral wall 229 of the frame 202 surrounds and covers the peripheral wall 232 of the rear housing 103. Accordingly, when assembled and installed, the rear panel assembly 105 may be not visible to the user. The front panel assembly 101 may comprise hooks (not shown) configured for snapping the front panel assembly 101 onto the rear panel assembly 105. In another embodiment, the front panel assembly 101 may be secured to the rear panel assembly 105 via a screw 237 to prevent it from being accidentally removed. In use, the customizable touch buttons 102 are backlit using the light sources 211 that illuminate the customizable indicia 251 on the removable labels 215 via the light bars 212 through the windows 244 in the front panel 201.

Referring to FIG. 3, there is shown a front view of the front panel 201. Front panel 201 may comprise a thin, light, and damage-resistant glass. However, the front panel 201 may comprise other types of materials known in the art, such as plastic. The front panel 201 may for example comprise a thickness of 1 mm and may comprise anti-smudge and other types of coating. The front panel 201 may comprise an adhesive (801, FIG. 9) partially disposed on its rear surface 253 such that it can be attached to the front panel frame 202.

The background area 243 of the front panel 201 may be tinted from the rear surface 253 using substantially opaque and non-translucent or non-transparent material, such as paint, film, or the like. Windows 244 are also formed on the rear surface 253 of the front panel 201 and may be translucent, or in other words semitransparent. The transmissivity levels of windows 244 will depend on the desired color of the front panel 201, as illustrated below. According to an embodiment, the front panel windows 244 may comprise a low transmissivity level such that the windows 244 are not perceived with respect to the background area 243 when viewed from the front surface 252 of the front panel 201. The windows 244 may be formed via tinting, printing, applying a film, engraving, etching, and/or similar processes. For example, a translucent tint may be first applied to the rear surface 253 of the front panel 201 to form the translucent layer of the windows 244. Then, an opaque tint may be applied to the rear surface 253 to form the opaque layer for the background area 243. The rear surface 253 may then be masked exposing the areas corresponding to the windows 244. The rear surface 253 may be etched to remove the opaque layer from the window areas 244, but leaving the translucent layer. Furthermore, the fixed touch button areas 104 may be printed with artwork on the rear surface 253. According to an alternative embodiment, after applying the translucent tint to the rear surface 253 of the front panel 201, the rear surface 253 may be masked to mask the windows 244 and expose the background area 243. Then, an opaque tint may be applied to the rear surface 253 to form the opaque layer for the background area 243. The mask may be removed to expose the windows 244.

Referring to FIG. 4, there is shown a front view of exemplary removable labels 215. The labels 215 may comprise flexible clear plastic films. Labels 215 may comprise a background area 401 and indicia areas 402 forming the indicia 251. Label background area 401 may be tinted from the rear surface of the label 215 using substantially opaque and non-translucent or non-transparent material, such as paint, film, or the like. According to an embodiment, the indicia areas 402 may be transparent to allow light pass fully therethrough. Although, according to another embodiment, the indicia areas 402 may be substantially translucent, or in other words semitransparent. The indicia areas 402 may be formed by tinting, printing, engraving, and/or similar processes. For example, an opaque tint may be applied to the rear surface of the label 215 to form the opaque layer for the background area 401. The rear surface of the label 215 may then be masked exposing the indicia areas 402. The rear surface of the label 215 may be etched to remove the opaque layer from the indicia areas 402 to leave the indicia areas 402 fully transparent. However, the process may be reversed by masking the indicia area 402 first, tinting the rear surface of the label 215 to form the background area 401, and then removing the mask from the indicia area 402. According to an embodiment, accent lines or outlines 404 may be applied around the periphery of the indicia areas 402.

The indicia 251 formed by the indicia areas 402 may comprise icons, logos, image, text, or the like, each identifying the load that is being controlled by the corresponding touch button 102. For example, the indicia 251 may comprise the following icons or text: mute, PC, laptop, BluRay, AirMedia, TV, HDMI, DVD, Video, Record, Document Camera, Camera, Lights, Shades, Shades Up or Down, Privacy, Select, Zoom, Lights, Lights On or Off, Up, Down, Left, or Right Arrow, Select, or the like. In addition, if less than the allotted number of touch buttons 102 are utilized, labels 403 with an opaque background area 401 may be provided without any indicia areas 402. Accordingly, the touch button 102 with such a label may be unperceivable from the front surface 252 of the front panel 201.

As shown in FIGS. 5A and 5B, the transmissivity of each label background area 401 may match that of the front panel background area 243 such that the windows 244 are not perceived by the user whether the touch buttons 102 are backlit or not via the light sources 211. As such, the label background area 401 is used to "blackout" or mask the window area 244. Additionally, the color of the widows 244 and the front panel background area 243 may comprise a substantially same color, but with different transmissivity levels, color shade, color tint, and/or color tone. According to an embodiment, when backlighting is turned off, as shown in FIG. 5A, the indicia areas 402 may blend in with the label background area 401 and the front panel background area 243 such that the indicia is substantially unperceivable by a user. This is because the windows 244 are not fully transparent, but are translucent or only partially transparent. On the other hand, when backlighting is turned on, as shown in FIG. 5B, light may pass through the indicia areas 402 and through the windows 244 in the front panel 201 such that the indicia 215 may be perceived by the user. Light, however, is blocked by the front panel background area 243 and the label background areas 401. As such, the labels 215, when placed in the control panel 100, will make the control panel 100 seem seamless such that a user is not able to detect from the front that the indicia 251 is placed via labels 215. Instead, it will appear that the front panel 201 is directly engraved with the indicia 251.

For example, the control panel 100 may comprise a black color configuration. In such an embodiment, the front panel background area 243 and the label background area 401 may be tinted using an opaque black color. The indicia areas 402 on labels 215 may be transparent. Windows 244 on front panel 201 of a black colored control panel 100 may comprise a translucent black color with about 10% transmissivity. However, the transmissivity level for the windows 244 for a black control panel configuration may range from about 3% transmissivity to about 15% transmissivity. This transmissivity level ensures that the control panel 100 looks seamless. For example, the windows 244 in a black control panel 100 may be formed by first applying a translucent black tint to the rear surface 253 of the front panel 201. Then, an opaque black tint may be applied to the rear surface 253 to form the opaque layer for the background area 243. The rear surface 253 may then be masked exposing the areas corresponding to the windows 244. The rear surface 253 may be etched to remove the opaque black layer from the window areas 244, but leaving the translucent black layer of the windows 244.

According to another embodiment, the control panel 100 may comprise a white color configuration. In such an embodiment, the front panel background area 243 may be opaque, while the windows 244 may be translucent with about 1% transmissivity. However, the transmissivity level for the windows 244 for a white panel configuration may range from about 0.5% transmissivity to about 3% transmissivity. The indicia areas 402 on labels 215 may be transparent, while the label background area 401 may comprise an opaque color, such as black or white. For example, the windows 244 in a white control panel 100 may be formed by first applying a translucent white tint layer to the rear surface 253 of the front panel 201. Then, an opaque black or white tint layer may be applied to the rear surface 253 over the translucent white tint layer to form the opaque background area 243. As such, the background area 243 may be formed using two layers, a translucent white layer and an opaque black or white layer. The rear surface 253 may then be masked exposing the areas corresponding to the windows 244. The rear surface 253 may be etched to remove the opaque black or white layer from the window areas 244, but leaving the translucent white layer of the windows 244. Because the transmissivity level of the translucent white layer is low, the control panel 100 will appear white from the front surface 252 of the front panel 201, even when a black opaque layer covers the translucent white layer from the back and when opaque black is used for label background areas 401. Other colors may be implemented in a similar fashion.

Referring to FIGS. 6-9, there is shown the label compartments 242, labels 215, and a method of inserting and locking the labels 215 in the label compartments 242 in greater detail. In particular, FIG. 6 illustrates a rear perspective view of the front panel assembly 101; FIG. 7 illustrates a front perspective view of the frame 202 showing the label compartment 242; FIGS. 8A-8C illustrate the steps of inserting the label 215 in the label compartment 242; and FIG. 9 illustrates a side cross sectional view of the label 215 inserted in the label compartment 242.

As shown in FIGS. 6, 7, 8A, and 9, each label compartment 242 may be defined between a top retaining wall 616, a bottom wall 618, and two side walls 610 extending transversely through the front wall 227 of the frame 202. The top retaining wall 616 may extend transversely from the rear surface 236 of the frame 202 to a top tapered wall 615. The top tapered wall 615 may taper down from the top retaining wall 616 to a terminal end 614 at the front surface 231 of the frame 202. The opening 241 in the frame 202 through which the label indicia may be seen may be defined between the terminal end 614 of the top tapered wall 615, the bottom wall 618, and the two side walls 610.

The label compartment 242 may further comprise two side shoulders 602 partially extending along the two side walls 610 and each comprising a first end 611 and a second end 612. The first end 611 of each side shoulder 602 may be distanced from the top retaining wall 616 forming a label receiving slot 620 between the first end 611 and the top retaining wall 616. The second ends 612 of the side shoulders 602 may be interconnected by a bottom shoulder 603 extending out of the bottom wall 618.

The side shoulders 602 and bottom shoulder 603 may comprise a rear surface 604 that extends substantially on the same plane as the rear surface 236 of the frame 202. The side shoulders 602 and bottom shoulder 603 further comprise a front surface 605 recessed in the front surface 228 of the frame 202. When the front panel 201 is attached to the frame 202, its rear surface 253 covers the opening 241 formed in the frame 202 thereby forming two vertical side grooves 606 between the front surfaces 605 of the side shoulders 602 and the rear surface 253 of the front panel 201 (FIG. 9). In addition, a horizontal bottom groove 607 is formed between the front surface 605 of the bottom shoulder 603 and the rear surface 253 of the front panel 201. According to an embodiment, the side grooves 606 and bottom groove 607 comprise a depth larger than a thickness of a removable label 215 such that the ends of the removable label may fit within the grooves 606 and 607. Each first end 611 of side shoulders 602 may further comprising a tapered wall 630 tapering down from the front surface 605 to the rear surface 604 of the side shoulders 602.

The bottom shoulder 603 may further comprise a tapered wall 609 tapering down from the rear surface 604 to a terminal end 613 of the bottom shoulder 603. A rectangular notch 617 may be recessed through a middle of the top retaining wall 616 and partially through the top tapered wall 615 and accessible from the rear surface 236 of the frame 202. The label compartment 242 may further comprise two projections 621 each extending out of the side wall 610 and/or the top tapered wall 615 between the first end 611 of the side shoulder 602 and the top retaining wall 616. The projections 621 may comprise a semicircular shape.

Referring to FIG. 8A, each label 215 may comprise a rectangular shape having a top end 623, a bottom end 624, and two side ends 625. Although the labels 215 may comprise other shapes, such as a square shape or the like. Two semicircular notches 627 may extend through the two side ends 625 proximate to the top end 623.

To secure the label 215 in the label compartment 242, the bottom end 624 of the label 215 is first inserted through the label receiving slots 620 between the top retaining wall 616, as well as the projections 621, and the first ends 611 of the side shoulders 602, and under the side shoulders 602, as shown in FIG. 8B. Because the label 415 is flexible, it can bend or deform while being inserted into the compartment 242. The tapered walls 630 of the side shoulders 602 guide the side ends 625 of the label 215 into the vertical side grooves 606. According to an embodiment, the label 215 comprises a width smaller than the width between the side walls 610 of the label compartment 242 and larger than the width between the two side shoulders 602 such that the side shoulders 602 retain the label 215 within the label compartment 242.

As shown in FIG. 8C, the label 215 is slid until the projections 621 in the label compartment 242 are received by the semicircular notches 627 in the side ends 625 of the label 215 to lock the label 215 in place. The label 215 comprises length configured for being received between the top retaining wall 616 and the bottom wall 618. The top end 623 of the label 215 may be retained by the top retaining wall 616 and be biased against the top tapered wall 615 of the label compartment 242. The bottom end 624 of the label 215 may be retained inside the bottom groove 607 between the bottom shoulder 603 and the rear surface 253 of the front panel 201. In this position, the indicia on the label 215 is configured to be centered and visible through the opening 241 in the front surface 228 of the frame 202.

Referring to FIG. 10, there is shown a side cross sectional view of the label 215 inserted in the label compartment 242 of the front panel assembly 101 as well as the light blocking cover 203, light bar 212, and user interface PCB 204 when the front panel assembly 101 is secured to the rear panel assembly 105. The light blocking cover 203 rests against the rear surface 236 of the frame 202 with the opening 225 in the light blocking cover 203 aligned with the opening 241 in the frame 202 as well as the window 244 in the front panel 201. In addition, the touch sensing field 210 on the user interface PCB 204 is aligned with the opening 225 in the light blocking cover 203, opening 241 in the frame 202, and window 244 in the front panel 201.

The front portion 901 of the light bar 212 may be received within the label compartment 242 between the side shoulders 602, bottom shoulder 603, and top retaining and tapered walls 615 and 616. The front portion 901 of the light bar 212 may reside in proximity to the label 215 such that the label 215 and indicia 251 thereon are disposed between the light bar 212 and the front panel 201. The rear portion 902 of the light bar 212 may be received within the opening 225 in the light blocking cover 203 and reside over the touch sensing field 210 on the user interface PCB 204. Accordingly, the light bar 212 is substantially contained within the label compartment 242 and the opening 225 in the light blocking cover 203 between the user interface PCB 204 and the label 215.

Light source 211, such as an LED, may extend out of the user interface PCB 204 and may be substantially contained within the opening 225 of the light blocking cover 203 between the front surface 213 of the user interface PCB 204 and the rear surface 236 of the frame 202. Light source 211 may be positioned adjacent the light bar 212 and may be configured to direct light to a side edge 905 of the light bar 212. According to an embodiment, the rear portion 902 of the light bar 212 may comprise a shoulder 904 comprising the side edge 905 extending down to the light source 211. Although, light may be directed to any other edge of the light bar 212, including top edge, or other side edges. When the light source 211 is turned on, light may be distributed by the light bar 212 from its side edge 905 in the rear portion 902, to the front portion 901 and out of its front surface. Light is then directed through the indicia areas 402 forming the indicia 251 on the label 215 and through window 244 in the front panel 201. Light bleeding to other label compartments 242 is inhibited by the light blocking cover 203 and the frame 202.

Referring to FIG. 8C, if necessary, label 215 may be removed from the label compartment 242 and replaced with a new label, for example to change label positioning to a different compartment 242 or to change the type of connected load. The label 215 may be removed by inserting a thin flat object, such as a flat screwdriver, in the notch 617 underneath the top end 623 of the label 215. The top end 623 may be pushed away from the notch 617 such that the top end 623 of the label 215 can be dislodged from the top retaining wall 616 and the projections 621. The label 215 may then be slid out of the label compartment 242.

Although the label compartments 242 are shown oriented with the label receiving slots 620 directed at an upward direction, the label receiving slots 620 may be directed in a downward or a sideways direction without departing from the scope of the present embodiments.

INDUSTRIAL APPLICABILITY

The disclosed embodiments provide a control panel assembly with customizable touch buttons. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A touch control panel assembly defining a plurality of touch buttons each adapted to control at least one function of at least one associated load, wherein the touch control panel assembly comprises:
  a front panel with a substantially flat front surface;
  a frame comprising a frame wall secured to a rear surface of the front panel, wherein the frame wall comprises a plurality of openings extending therethrough at locations corresponding to the touch buttons;
  a user interface board disposed behind the frame wall and comprising:
    a plurality of touch sensing fields disposed on a front surface of the user interface board at locations corresponding to the plurality of touch buttons to detect user input through the front panel; and
    a plurality of light sources disposed at locations corresponding to the plurality of touch buttons to provide individual backlighting;
  a plurality of label compartments defined by the openings in the frame wall and the rear surface of the front panel, wherein each label compartment comprises a pair of parallel side grooves each comprising a label receiving slot through a rear surface of the frame wall; and
  a plurality of labels each sized for being slidably inserted through the label receiving slots, within the pair of side grooves, and into one of the label compartments;
  wherein each label comprises an indicia, wherein when the label is inserted in the label compartment the indicia is aligned with the respective opening in the frame wall such that the indicia is disposed between the respective touch sensing field and the rear surface of the front panel to define the respective touch button perceivable through the front surface of the front panel at least when the respective light source is turned on.

2. The touch control panel assembly of claim 1, wherein each label compartment further comprises:
   a pair of oppositely disposed side walls extending transversely through the frame wall; and
   a pair of side shoulders each partially extending along one of the side walls from a first end to a send end, wherein each side shoulder comprises a front surface recessed in a front surface of the frame wall, wherein the pair of side grooves are formed between the front surfaces of the side shoulders and the rear surface of the front panel.

3. The touch control panel assembly of claim 2, wherein each side shoulder comprises a tapered wall tapering down from the front surface of the side shoulders to the first end of the side shoulder, wherein the tapered wall is adapted to guide one of the labels into the respective side groove.

4. The touch control panel assembly of claim 2, wherein each label compartment further comprises:
   a top retaining wall connected between the pair of side walls of the label compartment;
   wherein each first end of the side shoulders is spaced at a distance below the top retaining wall forming the label receiving slot.

5. The touch control panel assembly of claim 4, wherein the label compartment further comprises a pair of projections extending out of the side walls of the label compartment between the first ends of the side shoulders and the top retaining wall, wherein each label comprises a pair of side notches proximate a top end of the label, wherein each side notch is sized to receive one of the projections in the label compartment to lock the label within the label compartment.

6. The touch control panel assembly of claim 4, wherein the top retaining wall extends transversely from the rear surface of the frame wall to a top tapered wall, wherein the top tapered wall tapers down from the top retaining wall to a terminal end at the front surface of the frame wall.

7. The touch control panel assembly of claim 6, wherein the labels comprise flexible material, and wherein when one of the labels is inserted in one of the label compartments, a top end of the label is retained within the label compartment by the top retaining wall and is biased against the top tapered wall.

8. The touch control panel assembly of claim 6, wherein each label compartment further comprises a center notch recessed through a center of the top retaining wall and partially through a center of the top tapered wall and accessible from the rear surface of the frame wall, wherein the center notch is adapted to receive an object to facilitate removal of the label from the label compartment.

9. The touch control panel assembly of claim 2, wherein each label compartment further comprises a bottom wall comprising a bottom shoulder extending out of the bottom wall that comprises a front surface recessed in the front surface of the frame wall, wherein the bottom shoulder forms a bottom groove between the front surface of the bottom shoulder and the rear surface of the front panel, wherein when inserted a bottom end of the label is retained in the bottom groove.

10. The touch control panel assembly of claim 1 further comprising a rear panel assembly and a front panel assembly adapted to removably attach to the rear panel assembly; wherein the front panel assembly comprises the front panel and the frame; wherein the rear panel assembly comprises the user interface board and a rear housing adapted to be secured to a wall box.

11. The touch control panel assembly of claim 1, wherein each light source is disposed on the front surface of the user interface board adjacent the respective touch sensing field.

12. The touch control panel assembly of claim 11 further comprising a plurality of light bars each positioned over the respective touch sensing field and adjacent the respective light source.

13. The touch control panel assembly of claim 12, wherein each light source is adapted to direct light to a side edge of the respective light bar, and wherein the respective light bar is adapted to distribute light from its side edge to its front surface.

14. The touch control panel assembly of claim 12 further comprising a light blocking cover disposed between the user interface board and the frame wall, wherein the light blocking cover comprises a plurality of openings each sized to surround one of the light bars and the respective light source and adapted to be aligned with the respective touch button, wherein the light blocking cover comprises a substantially opaque material adapted to prevent light bleeding therethrough.

15. The touch control panel assembly of claim 14, wherein each light bar and the respective light source are substantially contained within the respective label compartment and the respective opening in the light blocking cover between the user interface board and the respective label preventing light bleeding to the remainder of the label compartments.

16. The touch control panel assembly of claim 1 further comprising a controller comprising an active timer and a standby timer, wherein the controller is adapted to:
   maintain the light sources at an off state;
   upon detecting user input by one of the touch sensing fields, restart the active timer and turn on the light sources to an active state;
   when the active timer expires, restart the standby timer and turn on the light sources to an idle state; and
   when the standby timer expires, turn off the light sources.

17. The touch control panel assembly of claim 1 further comprising a proximity sensor and a controller comprising an active timer and a standby timer, wherein the controller is adapted to:
   maintain the light sources at an off state;
   upon detecting an object proximate to the control panel by the proximity sensor, restart the active timeout timer and turn on the light sources to an active state;
   when the active timer expires, restart the standby timer and turn on the light sources to an idle state; and
   when the standby timer expires, turn off the light sources.

18. The touch control panel assembly of claim 1 further comprising a controller and a light sensor adapted to detect ambient light, wherein the controller is adapted to adjust light levels of the light sources based on the detected ambient light by the light sensor.

19. The touch control panel assembly of claim 1, wherein each label comprises a substantially opaque label background area and at least one transparent or substantially translucent indicia area forming the indicia thereon.

20. The touch control panel assembly of claim 19, wherein the indicia areas are adapted to permit light to pass therethrough from the respective light source to the front panel.

21. The touch control panel assembly of claim 19, wherein the front panel comprises a substantially opaque background area and a plurality of translucent windows disposed at locations corresponding to the touch buttons.

22. The touch control panel assembly of claim 21, wherein the front panel comprises a transparent material, wherein the front panel background area and the front panel windows are formed on the rear surface of the front panel.

23. The touch control panel assembly of claim 21, wherein a transmissivity level of each label background area substantially matches that of the front panel background area such that the front panel windows are substantially unperceivable from the front surface of the front panel.

24. The touch control panel assembly of claim 21, wherein the front panel windows comprise a low transmissivity level.

25. The touch control panel assembly of claim 21, wherein when the light sources are turned off, the label indicia areas are substantially unperceivable from the front surface of the front panel, wherein when the light sources are turned on light passes through the label indicia areas and the front panel windows such that the indicia is perceivable from the front surface of the front panel.

26. The touch control panel assembly of claim 21, wherein the front panel comprises a translucent layer substantially covering the rear surface of the front panel, and a substantially opaque layer disposed over the translucent layer, wherein the substantially opaque layer defines the panel background area by exposing areas forming the translucent widows.

27. A touch control panel assembly defining a plurality of touch buttons each adapted to control at least one function of at least one associated load, wherein the touch control panel assembly comprises:
 a rear panel assembly comprising:
  a rear housing adapted to be secured to a wall box, and
  a user interface board disposed in the rear housing and comprising a plurality of touch sensing fields disposed on a front surface of the user interface at locations corresponding to the plurality of touch buttons;
 a front panel assembly adapted to removably attach to the rear panel assembly, wherein the front panel assembly comprises:
  a front panel with a substantially flat front surface;
  a frame comprising a frame wall attached to a rear surface of the front panel, wherein the frame wall comprises a plurality of openings extending therethrough at locations corresponding to the touch buttons, and
  a plurality of label compartments defined by the openings in the frame wall and the rear surface of the front panel, wherein each label compartment comprises a pair of parallel side grooves each comprising a label receiving slot through a rear surface of the frame wall; and
 a plurality of labels each comprising in indicia, wherein each label is adapted to slidably insert through the label receiving slots, within the pair of side grooves, and into one of the label compartments when the front panel assembly is detached from the rear panel assembly;
 wherein when the front panel assembly is attached to the rear panel assembly, the user interface board is disposed adjacent the front panel such that the touch sensing fields are adapted to detect user input through the front panel, and each label indicia is disposed between one of the touch sensing fields and the rear surface of the front panel to define the touch button.

28. A touch control panel assembly defining a plurality of touch buttons each adapted to control at least one function of at least one associated load, wherein the touch control panel assembly comprises:
 a front panel with a substantially flat front surface and comprising a substantially opaque background area and a plurality of translucent windows disposed at locations aligned with the touch buttons;
 a frame comprising a frame wall attached to a rear surface of the front panel, wherein the frame wall comprises a plurality of openings extending therethrough at locations corresponding to the touch buttons that define a plurality of label compartments;
 a user interface board disposed behind the frame and comprising:
  a plurality of touch sensing fields disposed on a front surface of the user interface board at locations corresponding to the plurality of touch buttons to detect user input through the front panel, and
  a plurality of light sources each disposed on the front surface of the user interface adjacent one of the touch sensing fields; and
 a plurality of removable labels adapted to be inserted into and retained by the label compartments, wherein each label comprises a substantially opaque background area and at least one transparent or substantially translucent indicia area forming indicia thereon.

29. The touch control panel assembly of claim 28, wherein the indicia areas are adapted to permit light to pass therethrough from the respective light source to the front panel.

30. The touch control panel assembly of claim 28, wherein the front panel comprises a transparent material, wherein the front panel background area and the front panel windows are formed on the rear surface of the front panel.

31. The touch control panel assembly of claim 28, wherein the front panel background area and the front panel windows are formed using at least one of tinting, painting, applying a film, engraving, etching, and any combinations thereof.

32. The touch control panel assembly of claim 28, wherein a transmissivity level of each label background area substantially matches that of the front panel background area such that the front panel windows are substantially unperceivable from the front surface of the front panel.

33. The touch control panel assembly of claim 28, wherein the front panel windows comprise a low transmissivity level.

34. The touch control panel assembly of claim 28, wherein when the light sources are turned off, the label indicia areas are substantially unperceivable from the front surface of the front panel, wherein when the light sources are turned on light passes through the label indicia areas and the front panel windows such that the indicia is perceivable from the front surface of the front panel.

35. The touch control panel assembly of claim 28, wherein the front panel comprises a translucent layer substantially covering the rear surface of the front panel, and a substantially opaque layer disposed over the translucent layer, wherein the substantially opaque layer defines the panel background area by exposing areas forming the translucent widows.

36. The touch control panel assembly of claim 28 further comprising a plurality of light bars each positioned over the respective touch sensing field and adjacent the respective light source.

37. The touch control panel assembly of claim 36, wherein each light source is adapted to direct light to a side edge of the respective light bar, and wherein the respective light bar is adapted to distribute light from its side edge to its front surface.

\* \* \* \* \*